(12) United States Patent
Yamamoto et al.

(10) Patent No.: US 8,419,955 B2
(45) Date of Patent: Apr. 16, 2013

(54) ANTIREFLECTION STRUCTURE, LENS BARREL INCLUDING ANTIREFLECTION STRUCTURE, METHOD FOR MANUFACTURING ANTIREFLECTION STRUCTURE

(75) Inventors: Yoshiharu Yamamoto, Osaka (JP); Kenichi Ikeda, Osaka (JP); Yoshiki Hayashida, Osaka (JP)

(73) Assignee: Panasonic Corporation, Osaka (JP)

( * ) Notice: Subject to any disclaimer, the term of this patent is extended or adjusted under 35 U.S.C. 154(b) by 568 days.

(21) Appl. No.: 12/652,109

(22) Filed: Jan. 5, 2010

(65) Prior Publication Data
US 2010/0178462 A1 Jul. 15, 2010

(30) Foreign Application Priority Data

Jan. 7, 2009 (JP) .................................. 2009-001686
Jan. 7, 2009 (JP) .................................. 2009-001687

(51) Int. Cl.
*B29D 11/00* (2006.01)

(52) U.S. Cl.
USPC .............. 216/24; 359/609; 427/180; 428/147

(58) Field of Classification Search .......................... None
See application file for complete search history.

(56) References Cited

U.S. PATENT DOCUMENTS

| 4,374,158 | A | * | 2/1983 | Taniguchi et al. ............. 427/536 |
| 5,572,086 | A | * | 11/1996 | Tong et al. ..................... 313/478 |
| 6,010,774 | A | | 1/2000 | Kadokura et al. |
| 6,383,559 | B1 | * | 5/2002 | Nakamura et al. ............. 427/180 |
| 2001/0033434 | A1 | * | 10/2001 | Fukuzawa ..................... 359/811 |
| 2006/0052565 | A1 | | 3/2006 | Yoshioka et al. |
| 2006/0061868 | A1 | | 3/2006 | Hattori et al. |
| 2008/0003373 | A1 | * | 1/2008 | Yan et al. ....................... 427/444 |
| 2009/0120566 | A1 | | 5/2009 | Okayama et al. |
| 2009/0169859 | A1 | | 7/2009 | Biteau et al. |
| 2009/0176015 | A1 | | 7/2009 | Nakanishi et al. |

FOREIGN PATENT DOCUMENTS

| JP | 61-170702 | 8/1986 |
| JP | 11-281802 | 10/1999 |
| JP | 2001-272506 | 10/2001 |
| JP | 2002-60159 | 2/2002 |
| JP | 2005-15309 | 1/2005 |
| JP | 2006-69207 | 3/2006 |
| JP | 2006-70254 | 3/2006 |

\* cited by examiner

*Primary Examiner* — Binh X Tran
*Assistant Examiner* — David Cathey, Jr.
(74) *Attorney, Agent, or Firm* — Renner, Otto, Boisselle & Sklar, LLP (57) ABSTRACT

An antireflection structure that can be formed in a desired shape, and a method for manufacturing the same are provided. An antireflection structure 100 includes a resin layer 200 formed in a desired shape, and inorganic material fine particles 201 dispersed inside the resin layer. A plurality of fine concaves 202 having an average inner diameter shorter than or equal to the minimum wavelength of light whose reflection should be suppressed are formed at the surface of the antireflection structure 100, thereby reducing the equivalent refractive index at the surface of the resin layer 200. The fine concaves 202 are formed by, after forming a composite material in which the nanosized inorganic material fine particles 201 are dispersed in the resin layer, dissolving the inorganic material fine particles 201 dispersed at the surface of the resin layer 200, using a solvent that dissolves only the inorganic material fine particles 201.

9 Claims, 5 Drawing Sheets

ANTIREFLECTION STRUCTURE, LENS BARREL INCLUDING ANTIREFLECTION STRUCTURE, METHOD FOR MANUFACTURING ANTIREFLECTION STRUCTURE

CROSS-REFERENCE TO RELATED APPLICATION

This application is based on Japanese Patent Application Nos. 2009-001686 and 2009-001687 filed on Jan. 7, 2009. Hereby, the contents of Japanese Patent Application Nos. 2009-001686 and 2009-001687 are incorporated by reference.

BACKGROUND OF THE INVENTION

1. Field of the Invention

The present invention relates to an antireflection structure used for preventing reflection of light in an optical apparatus or the like, a lens barrel including the antireflection structure, and a method for manufacturing the antireflection structure.

2. Description of the Background Art

Japanese Laid-open Patent Publication No. 2005-15309 discloses, as a method for improving light transmissivity of a light transmitting material, that a porous silica film is formed on a surface of the light transmitting material to realize a low refractive index. In Japanese Laid-open Patent Publication No. 2005-15309, the percentage of pores in the silica film is increased to substantially reduce the refractive index, and consequently, the Fresnel reflectance is reduced.

Meanwhile, Japanese Laid-open Patent Publication No. 2006-70254 discloses a method for forming a film having a fine pattern structure. In the method disclosed in Japanese Laid-open Patent Publication No. 2006-70254, a cast film is formed by casting a polymer solution on a casting belt, and the cast film is caused to have dew condensation. Then, an organic solvent in the polymer solution is volatilized first, thereby forming a film having a plurality of pores corresponding to a region occupied by condensed water drops.

Furthermore, Japanese Laid-open Patent Publication No. 2006-69207 discloses a film, a refractive index of which is reduced by forming a sponge-like three-dimensional structure on a surface of a base material. In Japanese Laid-open Patent Publication No. 2006-69207, a mixture obtained by mixing a template agent and an initiator into a polymer material is applied to a base material, and after the polymer material is cured, the template agent is dissolved and removed by using an organic solvent, thereby forming a sponge-like three-dimensional structure. The sponge-like three-dimensional structure substantially reduces the refractive index, thereby reducing the Fresnel reflectance at the film surface.

Furthermore, Japanese Laid-open Patent Publication No. 2002-60159 proposes a method for forming a fine structure such as a porous body. In this method, part of polymer chains, in a microlayer separation structure including a block copolymer or a graft copolymer, is resolved or cut, and then the resolved or cut polymer chains are removed by washing, thereby forming a fine structure such as a porous body.

SUMMARY OF THE INVENTION

However, the above-described methods have the following drawbacks.

When the porous silica film disclosed in Japanese Laid-open Patent Publication No. 2005-15309 is formed, in order to ensure adhesion of the silica film, a substrate should be washed and subjected to a surface treatment in advance. Further, since the deposition thickness of the silica film, 50 to 2000 nm, is basically obtained when it is deposited on a plate-shaped substrate, the material shapes to which this method can be applied are restricted.

Likewise, the film formation method disclosed in Japanese Laid-open Patent Publication No. 2006-70254 cannot be applied to other material shapes than a flat plate, because it is a method of casting a solution on a flat belt.

Further, in the film formation method disclosed in Japanese Laid-open Patent Publication No. 2006-69207, it is necessary to promote polymerization of the polymer film while avoiding aggregation of the template agent. Therefore, the parameters of each material, such as viscosity and volume percentage, are restricted, leading to restriction on available materials.

Furthermore, in the fine structure formation method disclosed in Japanese Laid-open Patent Publication No. 2002-60159, ozone, light, electron beam, or the like is used to resolve or cut the polymer chains, and $CO_2$ gas in its critical or subcritical state is used to wash the resolved or cut polymer chains. Thus, special apparatus and materials are required.

Therefore, an object of the present invention is to provide an antireflection structure that can be formed in a desired shape, and a method for manufacturing the antireflection structure.

Another object of the present invention is to provide a lens barrel having the antireflection structure.

A manufacturing method according to the present invention is for manufacturing an antireflection structure which suppresses reflection of light having a wavelength longer than or equal to a predetermined wavelength. In the manufacturing method according to the present invention, a resin material is mixed with inorganic material fine particles which are dissolvable with a solvent that does not dissolve a resin material, and have an average particle diameter shorter than or equal to the predetermined wavelength, thereby preparing a composite material in which the inorganic material fine particles are dispersed in the resin material. A resin layer made of the prepared composite material is formed. The formed resin layer is immersed in the solvent to dissolve the inorganic material fine particles that are dispersed in at least a surface of the formed resin layer, thereby forming a plurality of fine concaves having an average inner diameter shorter than or equal to the predetermined wavelength.

Alternatively, in another manufacturing method according to the present invention, inorganic material fine particles, which are dissolvable with a solvent that does not dissolve a resin material and have an average particle diameter shorter than or equal to the predetermined wavelength, are mixed at a first volume percentage into the resin material, thereby preparing a first composite material. The inorganic material fine particles are mixed at a second volume percentage higher than the first volume percentage into the resin material, thereby preparing a second composite material. Using the first and second composite materials, a laminated body in which the first composite material and the second composite material are laminated is formed. The inorganic material fine particles, which are dispersed in a part from a surface of the second composite material to a predetermined depth, are dissolved with the solvent, thereby forming a part having a first porosity inside the laminated body, and a part having a second porosity larger than the first porosity at the surface of the second composite material.

An antireflection structure according to the present invention is for preventing reflection of light having a wavelength longer than or equal to a predetermined wavelength. The antireflection structure according to the present invention includes: a resin layer having a plurality of fine concaves in at least a surface thereof, the fine concaves having an average inner diameter shorter than or equal to the predetermined wavelength; and inorganic material fine particles dispersed inside the resin layer, the inorganic material fine particles being dissolvable with a solvent that does not dissolve the resin layer.

Alternatively, another antireflection structure according to the present invention includes: a resin layer; and inorganic material fine particles which are dispersed in a part of the resin layer, deeper than a predetermined depth from a surface of the resin layer, and are dissolvable with a solvent that does not dissolve the resin layer. The resin layer includes a part having a first porosity inside the resin layer, and a part having a second porosity larger than the first porosity at the surface of the resin layer.

Furthermore, a lens barrel according to the present invention includes the above-described antireflection structure on an inner surface thereof.

According to the present invention, an antireflection structure having a desired shape can be realized inexpensively and easily, using various materials.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 1:
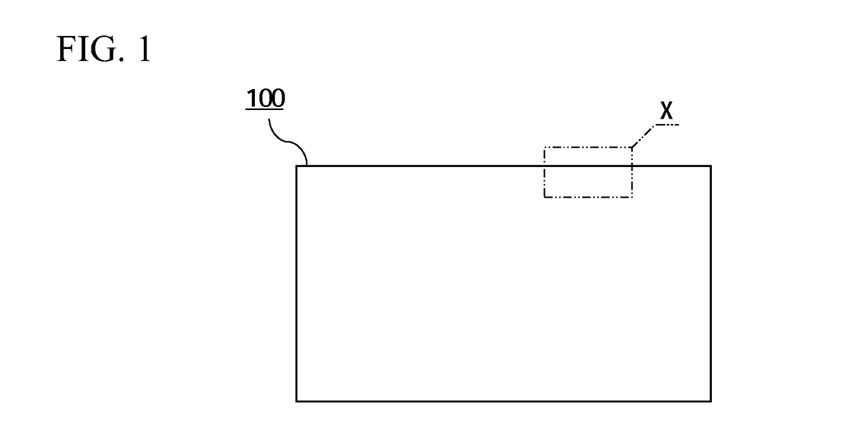
FIG. 1 is a schematic diagram showing an antireflection structure according to Embodiment 1 of the present invention.
Figure 2:
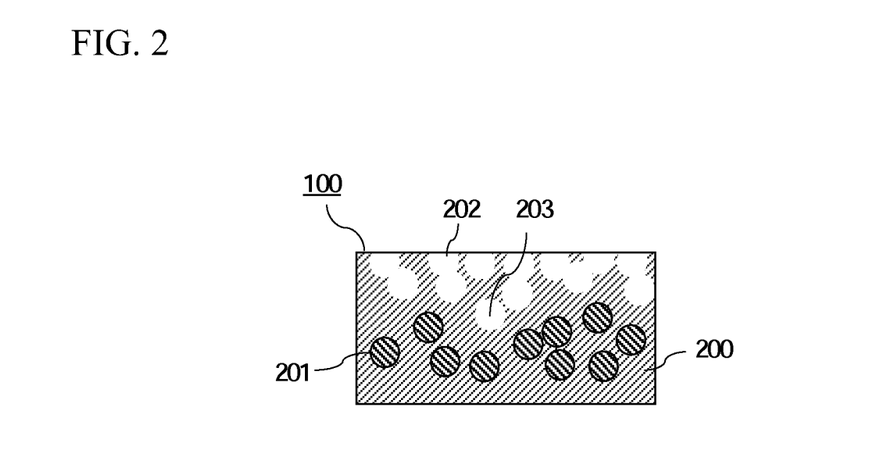
FIG. 2 is an enlarged sectional view showing a part X shown in FIG. 1.

FIG. 1 is a diagram showing an antireflection structure according to Embodiment 1 of the present invention, and FIG. 2 is an enlarged sectional view of a part X shown in FIG. 1.

The antireflection structure 100 includes: a resin layer 200 which is formed in a desired shape; and fine particles 201 of an inorganic material, which are dispersed inside the resin layer 200. The antireflection structure 100 is used for suppressing reflection of unnecessary light in an optical apparatus such as a lens barrel, an imaging device, or the like.

A thermoplastic resin having excellent formability can be used as the resin layer 200. In this embodiment, polycarbonate resin is used as the resin layer 200. Further, the resin layer 200 is colored in black using a dye. The resin layer 200 may be colored using a black pigment instead of the dye.

The inorganic material fine particles 201 are obtained by microparticulating, down to nanosize (less than 1 micron), an inorganic salt which is dissolvable with a solvent that does not dissolve the resin layer 200. The present embodiment adopts, as the inorganic material fine particles 201, sodium chloride which is dissolvable with "water" that does not dissolve polycarbonate resin. The average particle diameter of the sodium chloride is 100 nm, that is, it is set to be shorter than or equal to ⅓ of 400 nm (i.e., the short wavelength side of visible light) which is the minimum wavelength of light whose reflection should be suppressed.

Further, a plurality of fine concaves 202 are formed at the surface of the antireflection structure 100. These fine concaves 202 are formed by dissolving, with water, the inorganic material fine particles 201 (in this embodiment, sodium chloride) dispersed at the surface of the resin layer 200, during manufacturing of the antireflection structure 100. Accordingly, the average inner diameter of the fine concaves 202 is approximately equal to the average particle diameter of the inorganic material fine particles 201, and is shorter than or equal to the minimum wavelength of light whose reflection should be suppressed. Further, the inorganic material fine particles 201 which have been aggregated in a part from the surface of the resin layer 200 to a predetermined depth are also dissolved, thereby forming pores 203. As a result, a structure equivalent to a structure in which the refractive index gradually increases is formed from the surface of the antireflection structure 100 to the predetermined depth, whereby the antireflection effect is further improved.

Although in this embodiment sodium chloride is used as the inorganic material fine particles 201, other inorganic salts such as potassium chloride, potassium bromide, and the like may be used. Also in this case, an antireflection structure having the same effect as described above can be obtained.

Hereinafter, a method for manufacturing the antireflection structure 100 according to the present embodiment will be described.

First of all, the resin material is mixed with the inorganic material fine particles 201 to prepare a composite material in which the inorganic material fine particles 201 are dispersed in the resin material. As for the combination of the resin material and the inorganic material fine particles 201, any combination of a resin that is not dissolvable with a certain solvent and an inorganic material that is dissolvable with the same solvent is available, such as the combination of polycarbonate resin and sodium chloride exemplified in this embodiment, or combinations of materials exemplified in the respective embodiments to be described later. The method of mixing the resin material with the inorganic material fine particles 201 is not particularly restricted. Any method may be adopted so long as the inorganic material fine particles 201 can be appropriately dispersed in the resin material. For example, the inorganic material fine particles 201 prepared to have a predetermined average particle diameter may be mixed and kneaded into the resin material softened by heating. The inorganic material fine particles 201 having the predetermined average particle diameter can be prepared by, for example, a method of spraying and drying an inorganic salt solution using a spray dryer.

Next, the prepared composite material is formed into a desired shape to provide the resin layer 200. Since the composite material used in this invention is mainly composed of the resin, it can be easily formed into various shapes by using a known molding method.

Thereafter, the composite material formed into the desired shape is immersed in a solvent to dissolve the inorganic material fine particles 201 dispersed in at least the surface of the formed composite material. The solvent used in this process has a property that does not dissolve the resin layer 200 but dissolves the inorganic material fine particles 201, and water is used in the present embodiment. As a result, a plurality of fine concaves 202, each having an inner diameter shorter than or equal to the minimum wavelength of light whose reflection should be suppressed, are formed at the surface of the composite material.

Through the above-described process steps, the antireflection structure 100 that suppresses reflection of light having a wavelength longer than or equal to a predetermined wavelength is obtained.

As described above, according to the present embodiment, by adjusting the average particle diameter of the inorganic material fine particles 201, the plurality of fine concaves 202, each having an inner diameter shorter than or equal to the minimum wavelength of light whose reflection should be suppressed (in the above example, the inner diameter is shorter than or equal to $1/3$ of the minimum wavelength), are formed in at least the surface of the antireflection structure 100. Since the substantial refractive index at the surface of the resin layer 200 is reduced by the fine concaves 202, part of light applied to the antireflection structure 100, which part has a wavelength longer than or equal to a predetermined wavelength, can be suppressed.

In the above example, the average particle diameter of the inorganic material fine particles 201 is shorter than or equal to $1/3$ of the minimum wavelength of light whose reflection should be suppressed. However, the average particle diameter of the inorganic material fine particles 201 is preferably shorter than or equal to $1/10$ of the minimum wavelength of light whose reflection should be suppressed. In this case, the average inner diameter of the fine concaves 202 also becomes shorter than or equal to $1/10$ of the minimum wavelength of light whose reflection should be suppressed, in accordance with the average particle diameter of the inorganic material fine particles 201, and thereby reflection of light that diagonally enters the antireflection structure 100 can be suppressed more effectively. More preferably, the average particle diameter of the inorganic material fine particles 201 is shorter than or equal to $1/30$ of the minimum wavelength of light whose reflection should be suppressed. In this case, reflection of light that diagonally enters the antireflection structure 100 can be further suppressed, and moreover, scattering of light caused by the inorganic material fine particles 201, the fine concaves 202, and the pores formed inside the resin layer 200 can be suppressed. However, so long as the average particle diameter of the adopted inorganic material fine particles 201 is shorter than or equal to the minimum wavelength of light whose reflection should be suppressed, the formed antireflection structure 100 can exert the antireflection effect. Further, when the volume percentage of the inorganic material fine particles to the resin layer is 20% or more, the equivalent refractive index, which is determined by the refractive index of the resin layer, the refractive index of the fine concaves, and the volume percentage of the fine concaves, is sufficiently reduced relative to the refractive index of the resin layer, and thereby reflection can be further suppressed.

Furthermore, since the black resin layer 200 is used in the present embodiment, light that enters into the antireflection structure 100 from the surface thereof is absorbed and attenuated by the resin layer 200. Accordingly, the light that enters into the antireflection structure 100 is effectively prevented from being again outputted from the surface of the antireflection structure 100.

Embodiment 2

Figure 3:
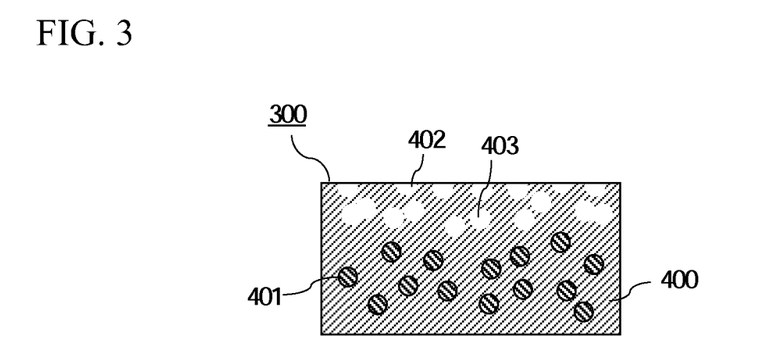
FIG. 3 is an enlarged sectional showing a part of an antireflection structure according to Embodiment 2 of the present invention.

FIG. 3 is an enlarged sectional view illustrating a part of an antireflection structure 300 according to Embodiment 2 of the present invention, which shows a part corresponding to FIG. 2 of Embodiment 1.

The antireflection structure 300 according to the present embodiment includes, similarly to Embodiment 1, a resin layer 400; and inorganic material fine particles 401 dispersed inside the resin layer 400. Further, in a part of the antireflection structure 300, from a surface thereof to a predetermined depth, fine concaves 402 and pores 403 are formed by dissolving the dispersed inorganic material fine particles.

The resin layer 400 is made of acrylic resin, and is colored in block by carbon black which is a pigment. The inorganic material fine particles 401 are made of magnesium fluoride which is dissolvable with nitric acid that does not dissolve acrylic resin.

Further, in the present embodiment, the average particle diameter of the inorganic material fine particles is 40 nm, that is, the inorganic material is microparticulated so as to have an average diameter equal to or shorter than $1/10$ of 400 nm (the short wavelength side of visible light) which is the minimum wavelength of light whose reflection should be suppressed. Accordingly, the average inner diameter of the fine concaves 402 formed at the surface of the antireflection structure 300 is also equal to or shorter than $1/10$ of the minimum wavelength of light whose reflection should be suppressed.

The antireflection structure 300 thus configured can exert the antireflection effect similar to that of Embodiment 1. Further, when the volume percentage of the inorganic material fine particles to the resin layer is 20% or more, the equivalent refractive index, which is determined by the refractive index of the resin layer, the refractive index of the fine concaves, and the volume percentage of the fine concaves, is sufficiently reduced relative to the refractive index of the resin layer, and thereby reflection can be further suppressed. Further, also in this embodiment, since the resin layer 400 is colored in black, light that once enters into the antireflection structure 300 is absorbed by the resin layer 200, and therefore, is prevented from being again outputted from the surface of the antireflection structure 300.

Further, the inorganic material fine particles 401 that have been aggregated in the part from the surface of the antireflection structure 300 to a predetermined depth are also dissolved, thereby forming the pores 403. As a result, a structure equivalent to a structure in which the refractive index of the resin layer 400 continuously increases from the surface toward the inside is obtained, and thereby the antireflection effect is further improved.

Since the method for manufacturing the antireflection structure 300 according to the present embodiment is identical to that described for Embodiment 1, repeated description is not necessary.

Although in the present embodiment magnesium fluoride is used as the inorganic material fine particles 401, calcium fluoride may be used instead of magnesium fluoride. Also in this case, an antireflection structure exerting the same effect as described above can be obtained. When calcium fluoride is used, water may be used as a solvent, instead of nitric acid.

Embodiment 3

Figure 4:
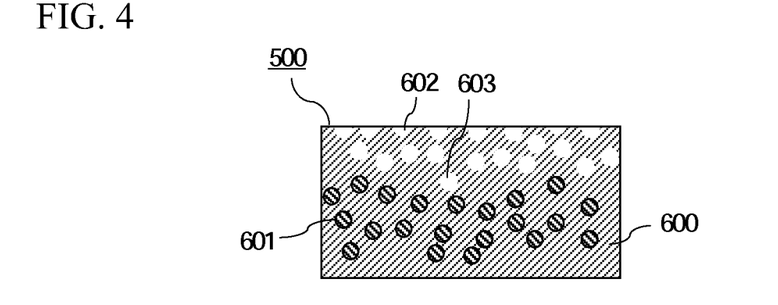
FIG. 4 is an enlarged sectional view showing a part of an antireflection structure according to Embodiment 3 of the present invention.

FIG. 4 is an enlarged sectional view illustrating a part of an antireflection structure 500 according to Embodiment 3 of the present invention, which shows a part corresponding to FIG. 2 of Embodiment 1.

The antireflection structure 500 according to the present embodiment includes, similarly to Embodiment 1, a resin layer 600; and inorganic material fine particles 601 dispersed inside the resin layer 600. Further, in a part of the antireflection structure 300, from its surface to a predetermined depth, fine concaves 602 and pores 603 are formed by dissolving the dispersed inorganic material fine particles.

The resin layer 600 is made of polystyrene resin, and is colored in block by carbon black. The inorganic material fine particles 601 are made of aluminum which is dissolvable with a water solution of hydrochloric acid that does not dissolve polystyrene.

Further, in the present embodiment, the average article diameter of the inorganic material fine particles 601 is 10 nm, that is, the inorganic material is microparticulated so as to have a diameter shorter than or equal to 1/30 of 400 nm (the short wavelength side of visible light) which is the minimum wavelength of light whose reflection should be suppressed. Accordingly, the average inner diameter of the fine concaves 602 formed at the surface of the antireflection structure 500 is also shorter than or equal to 1/30 of the minimum wavelength of light whose reflection should be suppressed.

The antireflection structure 500 thus configured can exert the antireflection effect similar to that of Embodiment 1. Further, when the volume percentage of the inorganic material fine particles to the resin layer is 20% or more, the equivalent refractive index, which is determined by the refractive index of the resin layer, the refractive index of the fine concaves, and the volume percentage of the fine concaves, is sufficiently reduced relative to the refractive index of the resin layer, and thereby reflection can be further suppressed. Further, also in this embodiment, since the resin layer 600 is colored in black, light that once enters into the antireflection structure 500 is absorbed by the resin layer, and therefore, is prevented from again being outputted from the surface of the antireflection structure 500.

Further, the inorganic material fine particles 601 which have been aggregated in the part from the surface of the antireflection structure 500 to a predetermined depth are also dissolved, thereby forming the pores 603. As a result, a structure equivalent to a structure in which the refractive index of the resin layer 600 continuously increases from the surface toward the inside is obtained, and thereby the antireflection effect is further improved.

Since the method for manufacturing the antireflection structure 500 according to the present embodiment is identical to that described for Embodiment 1, repeated description is not necessary.

Although in the present embodiment aluminum is used as the inorganic material fine particles 601, metal fine particles such as iron, copper, zinc, or the like may be used instead of aluminum. Also in this case, an antireflection structure exerting the same effect as described above can be obtained. When the metal fine particles other than aluminum are used, a solvent that does not dissolve the resin layer 500 may be selected from among various acids that dissolve the metal used.

Embodiment 4

Figure 5:
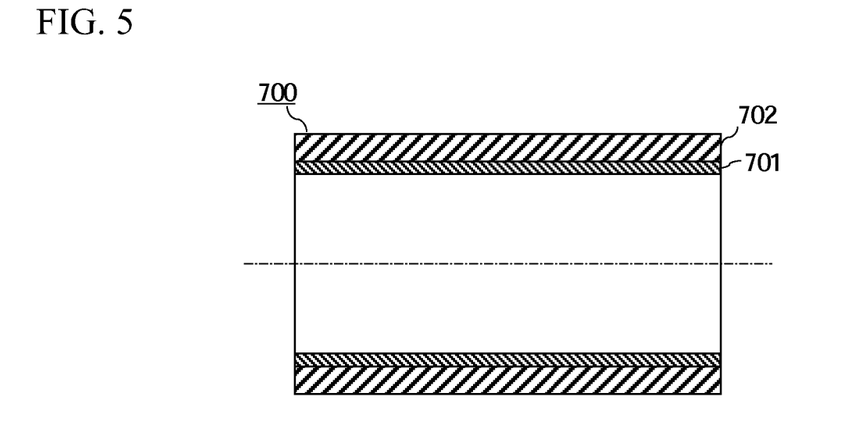
FIG. 5 is a longitudinal sectional view schematically showing a part of a lens barrel according to Embodiment 4 of the present invention.

FIG. 5 is a longitudinal sectional view schematically illustrating a part of a lens barrel according to Embodiment 4 of the present invention.

The lens barrel 700 is used in a camera with a built-in lens, a camera with interchangeable lenses, a video camera, and the like. The lens barrel 700 includes: a cylindrical holder barrel 702 that holds a lens element, a drive mechanism, and the like (not shown); and an antireflection structure 701 described for any of Embodiments 1 to 3. The antireflection structure 701 is formed into a cylindrical shape so as to cover an inner surface of the holder barrel 702.

The holder barrel 702 and the antireflection structure 701 can be formed by, for example, a dual-color injection type molding method. To be specific, initially, the holder barrel 702 is formed using a predetermined resin material. Next, a part to be the antireflection structure 701 is formed on the inner surface of the holder barrel 702, using a composite material obtained by mixing the resin material with the inorganic material fine particles. Then, the formed body is immersed in an appropriate solvent to dissolve and remove the inorganic material fine particles that are dispersed in at least the inner surface of the formed body. Through these process steps, the antireflection structure 701 integrated with the holder barrel 702 is obtained.

As described above, since the lens barrel 700 according to the present embodiment has, on its inner surface, the antireflection structure 701, light that diagonally enters the inner surface of the lens barrel 700 can be absorbed by the antireflection structure 701. Accordingly, reflection of light inside the lens barrel 700 can be suppressed, and occurrence of a flare on an imaging film or an image pickup element can be avoided, thereby realizing an image pickup optical system that can provide a high-contrast image, using the lens barrel 700.

Although in the present embodiment the antireflection structure 701 is formed on the inner surface of the holder barrel 702, it may be formed on an arbitrary position where occurrence of reflection should be suppressed, for example, on a surface of a holder frame that holds optical elements such as a lens element, prism, and the like.

Hereinafter, an antireflection structure according to the present invention and a manufacturing method thereof will be described with reference to the drawings. In FIGS. 6 to 12, for convenience of description, a part having a first porosity (a part derived from "a first composite material" described later) is indicated by right-upward hatching, while a part having a second porosity larger than the first porosity (a part derived from "a second composite material" described later) is indicated by right-downward hatching. Further, in FIG. 6, for convenience of illustration, a position corresponding to the boundary of these parts is shown by a line.

Embodiment 5

Figure 6:
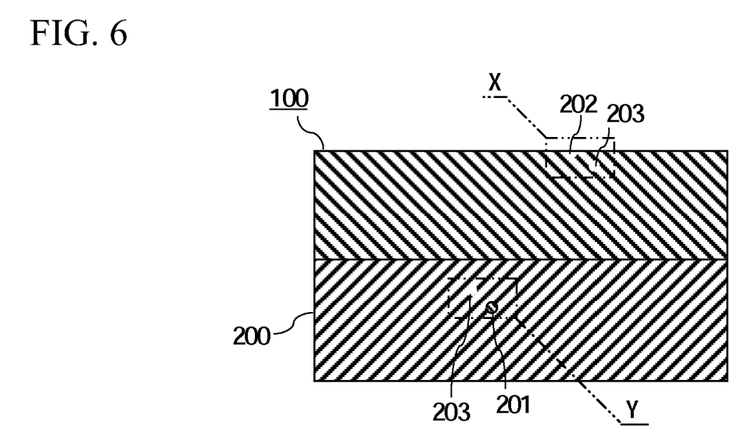
FIG. 6 is a schematic diagram showing an antireflection structure according to Embodiment 5 of the present invention.
Figure 7:
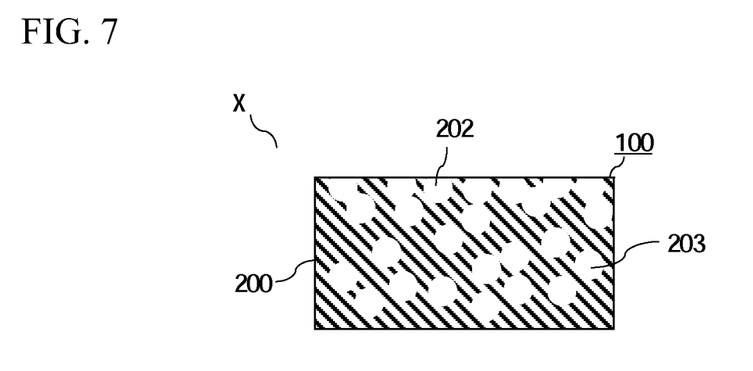
FIG. 7 is an enlarged sectional view of part X shown in FIG. 6.
Figure 8:
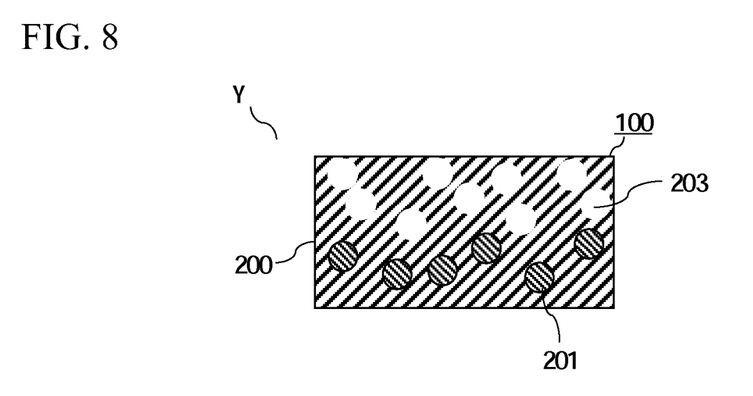
FIG. 8 is an enlarged sectional view of part Y shown in FIG. 6.

FIG. 6 is a diagram schematically illustrating an antireflection structure according to Embodiment 5 of the present invention. FIG. 7 is an enlarged sectional view of a part X shown in FIG. 6, and FIG. 8 is an enlarged sectional view of a part Y shown in FIG. 6.

The antireflection structure 100 includes a resin layer 200 formed into a desired shape; and inorganic material fine particles 201 dispersed inside the resin layer 200. The antireflection structure 100 is used for suppressing reflection of unnecessary light in an optical device such as a lens barrel, an imaging device, or the like.

A thermoplastic resin having excellent formability can be used as the resin layer 200. In the present embodiment, polycarbonate resin is used as the resin layer 200. Further, the resin layer 200 is colored in black using a dye. The resin layer 200 may be colored using a black pigment instead of the dye.

The inorganic material fine particles 201 are obtained by microparticulating, down to nanosize (less than 1 micron), an inorganic salt which is dissolvable with a solvent that does not dissolve the resin layer 200. The inorganic material fine particles 201 are dispersed in a part of the resin layer 200, deeper than a predetermined depth from the surface of the resin layer 200. In the present embodiment, sodium chloride, which is dissolvable with "water" as a solvent that does not dissolve polycarbonate resin, is adopted as the inorganic material fine particles 201. The average particle diameter of the sodium chloride is 100 nm, that is, it is set to shorter than or equal to ⅓ of 400 nm (i.e., the short wavelength side of visible light) which is the minimum wavelength of light whose reflection should be suppressed.

Further, a plurality of fine concaves 202 are formed at the surface of the resin layer 200, and a plurality of pores 203 are formed inside the resin layer 200. The fine concaves 202 and the pores 203 are formed by dissolving, with water, the inorganic material fine particles 201 (in this embodiment, sodium chloride) dispersed at the surface of the resin layer 200, during manufacturing of the antireflection structure 100. Accordingly, the average inner diameters of the fine concaves 202 and the pores 203 are approximately equal to the average particle diameter of the inorganic material fine particles 201, and are shorter than or equal to the minimum wavelength of light whose reflection should be suppressed.

Further, the formation percentage of the fine concaves 202 and pores 203 at the surface of the resin layer 200 is different from that inside the resin layer 200. To be specific, in the resin layer 200, a part having a first porosity (a volume percentage of the fine concaves 202 and pores 203) is formed inside thereof, and a part having a second porosity larger than the first porosity is formed at the surface thereof. In the present embodiment, the first porosity is 30%, and the second porosity is 60%.

As described above, the antireflection structure 100 according to the present embodiment is provided with, from the surface toward the inside, a part having a relatively large porosity, a part having a relatively small porosity, and a part where reduction in the effective refractive index is suppressed because the inorganic material fine particles 201 are left undissolved. Thus, a refractive index gradient is generated from the surface of the antireflection structure 100 toward the deep portion of the antireflection structure 100, and thereby reflection of light having a wavelength longer than or equal to a predetermined wavelength, which enters the surface, can be effectively suppressed.

Although in this embodiment sodium chloride is used as the inorganic material fine particles 201, other inorganic salts such as potassium chloride, potassium bromide, and the like may be used. Also in this case, an antireflection structure exerting the same effect as described above can be obtained.

Hereinafter, a method for manufacturing the antireflection structure 100 according to the present embodiment will be described.

First of all, nanosized (particle diameter of 1 μm or less) inorganic material fine particles 201 are mixed into the resin material to prepare a first composite material in which the inorganic material fine particles 201 are dispersed in the resin material. At this time, the mixture ratio of the inorganic material fine particles 201 to the resin material is determined such that the inorganic material fine particles 201 are contained, at a first volume percentage (e.g., 30%), in the resin material.

As for the resin material and the inorganic material fine particles 201, any combination of a resin that is not dissolvable with a certain solvent and an inorganic material that is dissolvable with the same solvent is available, such as the combination of polycarbonate resin and sodium chloride exemplified in this embodiment, or combinations of materials exemplified in the respective embodiments to be described later.

The method of mixing the resin material with the inorganic material fine particles 201 is not particularly limited. Any method may be adopted so long as the inorganic material fine particles 201 can be appropriately dispersed in the resin material. For example, the inorganic material fine particles 201 prepared to have a predetermined average particle diameter may be mixed and kneaded into the resin material softened by heating. The inorganic material fine particles 201 having the predetermined average particle diameter can be prepared by, for example, a method of spraying and drying an inorganic salt solution using a spray dryer.

Next, separately from the above-described first composite material, a second composite material in which the inorganic material fine particles 201 are dispersed in the resin material is prepared. The method for preparing the second composite material is identical to that for the first composite material. However, the mixture ratio of the inorganic material fine particles 201 to the resin material is set such that the inorganic material fine particles 201 are contained, in the resin material, at a second volume percentage (e.g., 60%) larger than the first volume percentage.

Next, using the prepared first and second composite materials, a laminated body in which the first composite material and the second composite material are laminated is formed. At this time, the lamination order of the first and second composite materials is determined so that light whose reflection should be suppressed is incident on the surface of the second composite material. Since the composite materials used in the present invention are mainly composed of the resin, the composite materials can be formed into various shapes using a known molding method such as a dual-color molding method. Further, either of the process of molding the first composite material or the process of molding the second composite material may be performed first.

Then, the laminated body formed into a desired shape is immersed in a solvent to dissolve the inorganic material fine particles 201 that are dispersed in a part from the surface of the second composite material to a predetermined depth. The solvent used in this process has a property that does not dissolve the resin material but dissolves the inorganic material fine particles 201, and water is adopted in this embodiment.

As a result, a plurality of fine concaves 202, each having an inner diameter shorter than or equal to the minimum wavelength of light whose reflection should be suppressed, are formed at the surface of the second composite material. Further, the water penetrates into the resin layer 200 through paths that are caused by dissolution of the aggregated inorganic material fine particles and through gaps that are formed at the boundaries between the resin material and the inorganic material fine particles 201, and the water dissolves the inorganic material fine particles dispersed inside the resin material, resulting in the pores 203.

However, since the first volume percentage is smaller than the second volume percentage as described above, dissolution of the inorganic material fine particles 201 dispersed in the layer comprising the first composite material progresses slower than dissolution of the inorganic material fine particles 201 dispersed in the layer comprising the second composite material. Accordingly, by adjusting the time to treat the laminated body with the solvent, the inorganic material fine particles 201 existing in a part of the second composite material, deeper than a predetermined depth from the surface of the second composite material are left undissolved (FIG. 8), thereby forming, inside the resin material, a part having a relatively small reduction in the effective refractive index.

Through the above-described process steps, the antireflection structure 100 that suppresses reflection of light having a wavelength longer than or equal to the predetermined wavelength can be obtained.

As described above, according to the method for manufacturing the antireflection structure 100 of the present embodiment, by adjusting the average particle diameter of the inorganic material fine particles 201, a plurality of fine concaves 202, each having an inner diameter shorter than or equal to the minimum wavelength of light whose reflection should be suppressed (in the above example, an inner diameter shorter than or equal to $1/3$ of the minimum wavelength), are formed in at least the surface of the antireflection structure 100. Since the substantial refractive index at the surface of the resin layer 200 is reduced by the fine concaves 202, part of light applied to the antireflection structure 100, which part has a wavelength longer than or equal to a predetermined wavelength, can be suppressed.

In addition, in the manufacturing method according to the present embodiment, the second composite material in which the inorganic material fine particles 201 are dispersed at the second volume percentage larger than the first volume percentage is laminated on the first composite material in which the inorganic material fine particles 201 are dispersed at the first volume ratio, and thereafter, the inorganic material fine particles 201 that are included in the part from the surface of the second composite material to the inside of the first composite material are dissolved using the solvent. As a result, a refractive index gradient is generated, in which the effective refractive index gradually increases from the surface of the second composite material at which the effective refractive index is significantly reduced, toward the inside of the resin layer 200 where the inorganic material fine particles 201 remain undissolved, thereby realizing the antireflection structure 100 which can further suppress the surface reflection.

Further, in the antireflection structure manufacturing method according to the present embodiment, special devices and materials are not required, and the adopted materials are inexpensive. Therefore, according to the manufacturing method of the present embodiment, the antireflection structure having excellent antireflection effect can be manufactured inexpensively and easily.

Furthermore, in the present embodiment, since the black resin layer 200 is used, light that enters into the antireflection structure 100 from the surface thereof is absorbed and attenuated by the resin layer 200. Accordingly, the light that enters into the antireflection structure 100 is effectively prevented from being again outputted from the surface thereof.

Although in the above example the average particle diameter of the inorganic material fine particles 201 is shorter than or equal to $1/3$ of the minimum wavelength of light whose reflection should be suppressed, the average particle diameter of the inorganic material fine particles 201 is preferably shorter than or equal to $1/10$ of the minimum wavelength of light whose reflection should be suppressed. In this case, the average inner diameter of the fine concaves 202 also becomes shorter than or equal to $1/10$ of the minimum wavelength of light whose reflection should be suppressed, whereby reflection of light that obliquely enters the antireflection structure 100 can be suppressed more effectively.

More preferably, the average particle diameter of the inorganic material fine particles 201 is shorter than or equal to $1/30$ of the minimum wavelength of light whose reflection should be suppressed. In this case, reflection of light that obliquely enters the antireflection structure 100 can be suppressed more effectively, and moreover, scattering of light due to the inorganic material fine particles 201, the fine concaves 202, and the pores 203 formed inside the resin layer 200 can be suppressed.

However, so long as the average particle diameter of the inorganic material fine particles 201 is shorter than or equal to the minimum wavelength of light whose reflection should be suppressed, the formed antireflection structure 100 can exert the antireflection effect.

Embodiment 6

Figure 9:
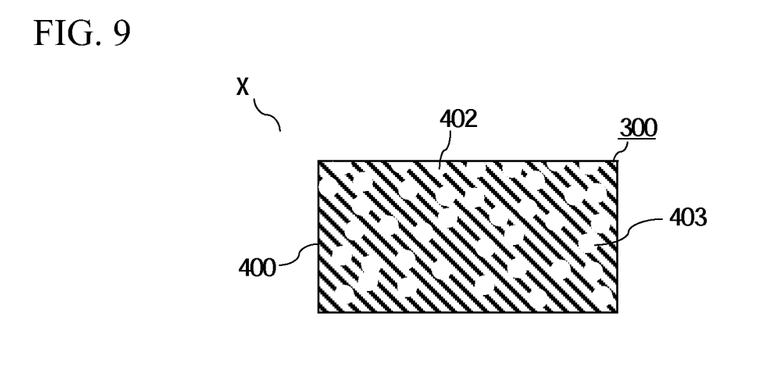
FIG. 9 is an enlarged sectional view of a part at a surface of an antireflection structure according to Embodiment 6 of the present invention.
Figure 10:
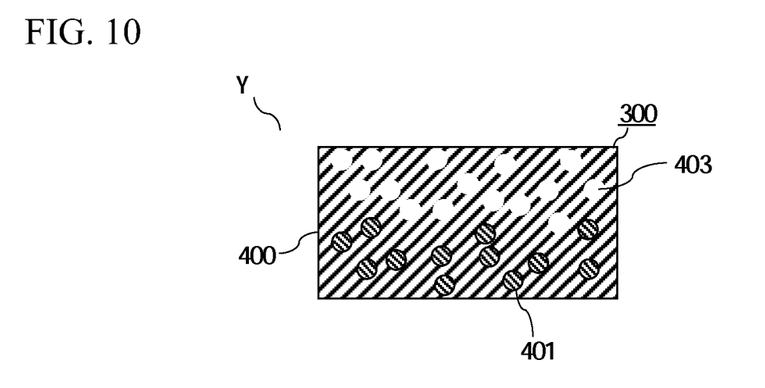
FIG. 10 is an enlarged sectional view of a part inside the antireflection structure according to Embodiment 6 of the present invention.

FIG. 9 is an enlarged sectional view illustrating a part at a surface of an antireflection structure according to Embodiment 6 of the present invention, which shows a part (part X) corresponding to FIG. 7 of Embodiment 5. Further, FIG. 10 is an enlarged sectional view illustrating a part inside the antireflection structure according to Embodiment 6, which shows a part (part Y) corresponding to FIG. 8 of Embodiment 5.

The antireflection structure 300 according to the present embodiment includes, similarly to Embodiment 5, a resin layer 400; and inorganic material fine particles 401 which are dispersed in a part of the resin layer 400, deeper than a predetermined depth from the surface of the resin layer 400.

The resin layer 400 is made of acrylic resin, and is colored in block by carbon black which is a pigment.

The inorganic material fine particles 401 are made of magnesium fluoride which is dissolvable with nitric acid that does not dissolve acrylic resin. In the present embodiment, the average particle diameter of the inorganic material fine particles 401 is 40 nm, that is, the inorganic material is microparticulated so as to have an average diameter equal to or shorter than $1/10$ of 400 nm (the short wavelength side of visible light) which is the minimum wavelength of light whose reflection should be suppressed. Accordingly, the average inner diameters of the fine concaves 402 and the pores 403 formed in the resin layer 400 are also equal to or shorter than $1/10$ of the minimum wavelength of light whose reflection should be suppressed.

Further, also in the present embodiment, in the resin layer 400, a part having a first porosity (volume percentage of the fine concaves 402 and pores 403) is formed inside thereof, and a part having a second porosity larger than the first porosity is formed at the surface thereof. In this embodiment, the first porosity is 35%, and the second porosity is 65%.

The antireflection structure 300 thus configured can exert the antireflection effect similar to that of Embodiment 5. Further, also in this embodiment, since the resin layer 400 is colored in black, light which once enters into the antireflection structure 300 is absorbed by the resin layer, and therefore, is prevented from being again outputted from the surface of the antireflection structure 300.

A method for manufacturing the antireflection structure 300 according to the present embodiment is identical to that described for Embodiment 5 except the adopted materials and the mixture ratio of the inorganic material fine particles. In this embodiment, the volume percentage of the inorganic material fine particles 401 contained in the first composite material is 35%, and the volume percentage of the inorganic material fine particles contained in the second composite material is 65%.

Although in the present embodiment magnesium fluoride is used as the inorganic material fine particles 401, calcium fluoride may be used instead of magnesium fluoride. Also in this case, an antireflection structure exerting the same effect as described above can be obtained. When calcium fluoride is used, water may be used as a solvent, instead of nitric acid.

Embodiment 7

Figure 11:
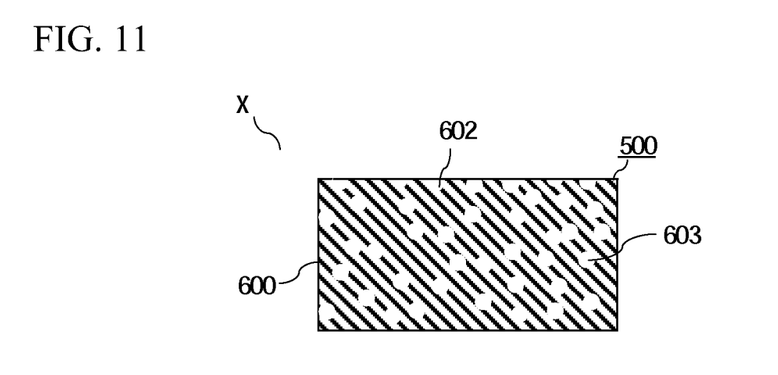
FIG. 11 is an enlarged sectional view of a part at a surface of an antireflection structure according to Embodiment 7 of the present invention.
Figure 12:
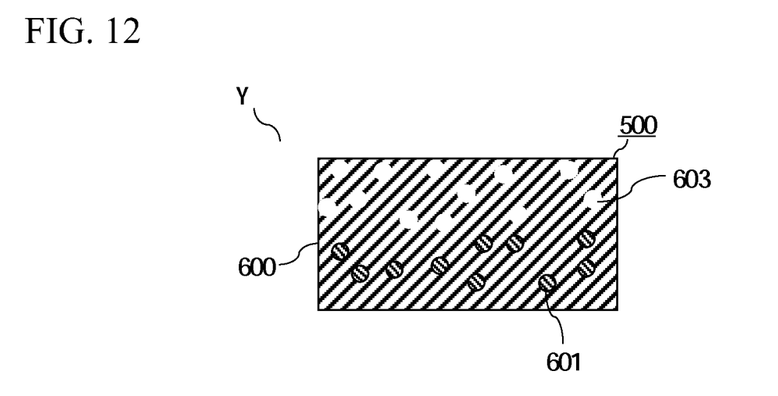
FIG. 12 is an enlarged sectional view of a part inside the antireflection structure according to Embodiment 7 of the present invention.

FIG. 11 is an enlarged sectional view illustrating a part at a surface of an antireflection structure according to Embodiment 7 of the present invention, which shows a part (part X) corresponding to FIG. 7 of Embodiment 5. Further, FIG. 12 is an enlarged sectional view illustrating a part inside the antireflection structure according to Embodiment 7, which shows a part (part Y) corresponding to FIG. 8 of Embodiment 5.

The antireflection structure 500 according to the present embodiment includes, similarly to Embodiment 5, a resin layer 600; and inorganic material fine particles 601 dispersed in a part of the resin layer 600, deeper than a predetermined depth from the surface of the resin layer 600.

The resin layer 600 is made of polystyrene resin, and is colored in block by carbon black which is a pigment.

The inorganic material fine particles 601 are made of aluminum which is dissolvable with a hydrochloric acid solution that does not dissolve polystyrene resin. In the present embodiment, the average particle diameter of the inorganic material fine particles 601 is 10 nm, that is, the inorganic material is microparticulated so as to have an average diameter shorter than or equal to $1/30$ of 400 nm (the short wavelength side of visible light) which is the minimum wavelength of light whose reflection should be suppressed. Accordingly, the average inner diameters of fine concaves 602 and pores 603 formed in the resin layer 600 are also shorter than or equal to $1/10$ of the minimum wavelength of light whose reflection should be suppressed.

Further, also in the present embodiment, in the resin layer 600, a part having a first porosity (volume percentage of the fine concaves 602 and pores 603) is formed inside thereof, and a part having a second porosity larger than the first porosity is formed at the surface thereof In this embodiment, the first porosity is 25%, and the second porosity is 55%.

The antireflection structure 500 thus configured can exert the antireflection effect similar to that of Embodiment 5. Further, also in this embodiment, since the resin layer 600 is colored in black, light which once enters into the antireflection structure 500 is absorbed by the resin layer, and therefore, is prevented from being again outputted from the surface of the antireflection structure 500.

A method for manufacturing the antireflection structure 500 according to the present embodiment is identical to that described for Embodiment 5 except the adopted materials and the mixture ratio of the inorganic material fine particles. In this embodiment, the volume percentage of the inorganic material fine particles 601 contained in the first composite material is 55%, and the volume percentage of the inorganic material fine particles contained in the second composite material is 65%.

Although in the present embodiment aluminum is used as the inorganic material fine particles 601, metal fine particles such as iron, copper, zinc, or the like may be used instead of aluminum. Also in this case, an antireflection structure exerting the same effect as described above can be obtained. When the metal fine particles other than aluminum are used, an acid that does not dissolve the resin layer 500 may be selected from among various acids that dissolve the metal used.

Embodiment 8

Figure 13:
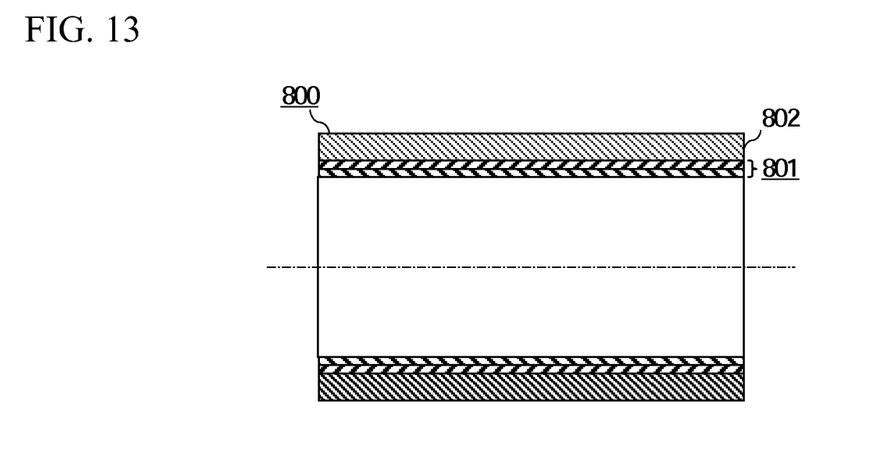
FIG. 13 is a longitudinal sectional view schematically showing a part of a lens barrel according to Embodiment 8 of the present invention.

FIG. 13 is a longitudinal sectional view schematically illustrating a part of a lens barrel according to Embodiment 8 of the present invention.

The lens barrel 800 is used in a camera with a built-in lens, a camera with interchangeable lenses, a video camera, and the like. The lens barrel 800 includes: a cylindrical holder barrel 802 that holds a lens element, a drive mechanism, and the like (not shown); and an antireflection structure 801 described for any of Embodiments 5 to 7. The antireflection structure 801 is formed in a cylindrical shape so as to cover an inner surface of the holder barrel 802.

To be specific, a part having a first porosity (a part with right-upward hatching) and a part having a second porosity larger than the first porosity (a part with right-downward thick hatching) are formed in order, from the inner surface of the holder barrel 802. In this configuration, a refractive index gradient is formed from the inner side of the lens barrel 800 outward, in a direction perpendicular to the optical axis (shown by an alternate long and short dash line in FIG. 13), whereby the antireflection effect at the inner surface of the lens barrel 800 is further improved.

The holder barrel 802 and the antireflection structure 801 can be formed by, for example, a dual-color injection type molding method. To be specific, initially, the holder barrel 802 is formed using a predetermined resin material. Next, a first composite material that contains the inorganic material fine particles at a first volume percentage and a second composite material that contains the inorganic material fine particles at a second volume percentage (the second volume percentage>the first volume percentage) are laminated in order on the inner surface of the holder barrel 802, thereby forming a laminated body. Then, using an appropriate solvent that dissolves only the inorganic material fine particles, the inorganic material fine particles existing in a part from the surface of the second composite material to the first composite material are dissolved and removed. Through these process steps, the antireflection structure 801 integrated with the holder barrel 802 is obtained.

Since the lens barrel 800 according to the present embodiment contains the antireflection structure 801, reflection of light inside the lens barrel 800 can be suppressed, and occurrence of a flare on an imaging film or an image pickup element can be avoided. As a result, it is possible to realize an image pickup optical system that can provide a high-contrast image, using the lens barrel 800.

In the respective embodiments described above, the boundary between the first composite material and the second composite material is not necessarily clear. More preferably, the first composite material and the second composite material are mixed with each other at and around the boundary between them, because, in this case, reflection at the boundary between the first composite material and the second composite material is suppressed.

Although in the respective embodiments described above, the antireflection structure is formed using two kinds of composite materials having different mixing ratios of the inorganic material fine particles, the antireflection structure may be formed using three or more kinds of composite materials having different mixing ratios of the inorganic material fine particles. Also in this case, an antireflection structure that exerts the same effect as those of the respective embodiments described above can be formed by laminating the respective composite materials so that the porosity decreases from the resin surface inward.

Further, although in Embodiments 5 to 7, the first and second composite materials are prepared using the same resin material and the same inorganic material fine particles, different resin materials may be used for the first and second composite materials, or different kinds of inorganic material fine particles may be used for the first and second composite materials.

Further, although in Embodiment 8, the antireflection structure is formed on the inner surface of the holder barrel, the antireflection structure may be formed on arbitrary positions or members, in which occurrence of reflection should be suppressed. For example, the antireflection structure may be formed on the surface of a holder frame for holding optical elements such as a lens element, prism, and the like.

For example, the present invention is applicable as an antireflection structure for suppressing reflection of light inside a lens barrel of a still camera or a video camera.

While the invention has been described in detail, the foregoing description is in all aspects illustrative and not restrictive. It is understood that numerous other modifications and variations can be devised without departing from the scope of the invention.

What is claimed is:

1. A method for manufacturing an antireflection structure which suppresses reflection of light having a wavelength longer than or equal to a predetermined wavelength, the method comprising:

mixing a polycarbonate, acrylic, or polystyrene resin material with inorganic material fine particles, the inorganic material fine particles being dissolvable with a solvent that does not dissolve the resin material, and having an average particle diameter shorter than or equal to the predetermined wavelength, thereby preparing a composite material in which the inorganic material fine particles are dispersed in the resin material;

forming a resin layer made of the prepared composite material; and immersing the formed resin layer in the solvent to dissolve the inorganic material fine particles that are dispersed in at least a surface of the formed resin layer, thereby forming a plurality of fine concaves having an average inner diameter shorter than or equal to the predetermined wavelength.

2. The method for manufacturing the antireflection structure according to claim 1, wherein the inorganic material fine particles are made of one of an inorganic salt, a fluoride, and a metal.

3. The method for manufacturing the antireflection structure according to claim 1, wherein the solvent is water or an acid.

4. The method for manufacturing the antireflection structure according to claim 1, wherein the resin layer is black.

5. The method for manufacturing the antireflection structure according to claim 4, wherein the resin layer contains a black dye or a black pigment.

6. The method for manufacturing the antireflection structure according to claim 1, wherein the average particle diameter of the inorganic material fine particles is shorter than or equal to $1/3$ of the predetermined wavelength.

7. The method for manufacturing the antireflection structure according to claim 1, wherein the average particle diameter of the inorganic material fine particles is shorter than or equal to $1/10$ of the predetermined wavelength.

8. The method for manufacturing the antireflection structure according to claim 1, wherein the average particle diameter of the inorganic material fine particles is shorter than or equal to $1/30$ of the predetermined wavelength.

9. The method for manufacturing the antireflection structure according to claim 1, wherein a volume percentage of the inorganic material fine particles to the resin material is higher than or equal to 20%.

* * * * *